(12) United States Patent
Hada et al.

(10) Patent No.: US 8,272,421 B2
(45) Date of Patent: Sep. 25, 2012

(54) SYSTEM FOR MANUFACTURING LIQUID CRYSTAL DISPLAY DEVICE

(75) Inventors: Kazuya Hada, Ibaraki (JP); Seiji Umemoto, Ibaraki (JP); Takuya Nakazono, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 44 days.

(21) Appl. No.: 13/080,765

(22) Filed: Apr. 6, 2011

(65) Prior Publication Data
US 2012/0103532 A1 May 3, 2012

(30) Foreign Application Priority Data

Nov. 2, 2010 (JP) ................. 2010-246496

(51) Int. Cl.
*B32B 37/22* (2006.01)
(52) U.S. Cl. ........ 156/556; 156/521; 156/539; 156/543; 156/557
(58) Field of Classification Search .................. 156/521, 156/539, 540, 541, 542, 543, 556, 557
See application file for complete search history.

(56) References Cited

U.S. PATENT DOCUMENTS

| | | | |
|---|---|---|---|
| 8,172,631 B2 * | 5/2012 | Hirata et al. ................ | 349/96 |
| 2005/0016670 A1 | 1/2005 | Kanbara et al. | |
| 2005/0199337 A1 | 9/2005 | Nishikubo et al. | |
| 2006/0124248 A1 | 6/2006 | Kanbara et al. | |
| 2009/0218049 A1 | 9/2009 | Kanbara et al. | |
| 2009/0263608 A1 | 10/2009 | Kitada et al. | |
| 2010/0186890 A1 | 7/2010 | Kitada et al. | |
| 2010/0206977 A1 | 8/2010 | Kitada et al. | |
| 2010/0212822 A1 | 8/2010 | Kitada et al. | |
| 2010/0258250 A1 | 10/2010 | Kitada et al. | |
| 2010/0282406 A1 | 11/2010 | Kitada et al. | |

(Continued)

FOREIGN PATENT DOCUMENTS

JP   11-231129 A   8/1999
(Continued)

OTHER PUBLICATIONS

Korean Office Action dated Oct. 10, 2011, issued in corresponding Korean Patent Application No. 10-2011-0005545.

(Continued)

*Primary Examiner* — Katarzyna Wyrozebski Lee
*Assistant Examiner* — John Blades
(74) *Attorney, Agent, or Firm* — Westerman, Hattori, Daniels & Adrian, LLP

(57) ABSTRACT

Provided is a liquid crystal display device manufacturing system having high productivity per space for installation of manufacturing equipment and making it possible to increase safety by separation of a feed path and a working path and to reduce equipment cost. The system includes a pair of manufacturing apparatuses 100 including panel feeding lines L2 arranged in the same direction, continuous roll R1 and R2 introduction parts 101 and 102, and a pair of film feeding lines L1, wherein the continuous roll R1 and R2 introduction parts 101 and 102 of one and the other of the manufacturing apparatuses 100 are placed on one same side located inside or outside the pair of film feeding lines L1, so that there is no need to provide a continuous roll R1 and R2 feed path P100 and a working path P200 in the same aisle, which can provide high productivity per space for installation of manufacturing equipment 100 and increase safety by separation of a feed path P100 and a working path P200.

12 Claims, 11 Drawing Sheets

U.S. PATENT DOCUMENTS

| | | |
|---|---|---|
| 2010/0300606 A1 | 12/2010 | Kitada et al. |
| 2011/0030884 A1 | 2/2011 | Yura et al. |
| 2011/0126988 A1 | 6/2011 | Kitada et al. |

FOREIGN PATENT DOCUMENTS

| | | |
|---|---|---|
| JP | 2005-037417 A | 2/2005 |
| JP | 2009-175653 A | 8/2009 |
| JP | 2009-276751 A | 11/2009 |
| JP | 2009-276754 A | 11/2009 |
| KR | 2002-0064549 A | 8/2002 |
| TW | 520452 B | 2/2003 |

OTHER PUBLICATIONS

Taiwanese Office Action dated Sep. 16, 2011, issued in corresponding Taiwanese Patent Application No. 099142442.

European Search Report dated Feb. 20, 2012, issued in corresponding European Patent Application No. 11165603.9.

* cited by examiner

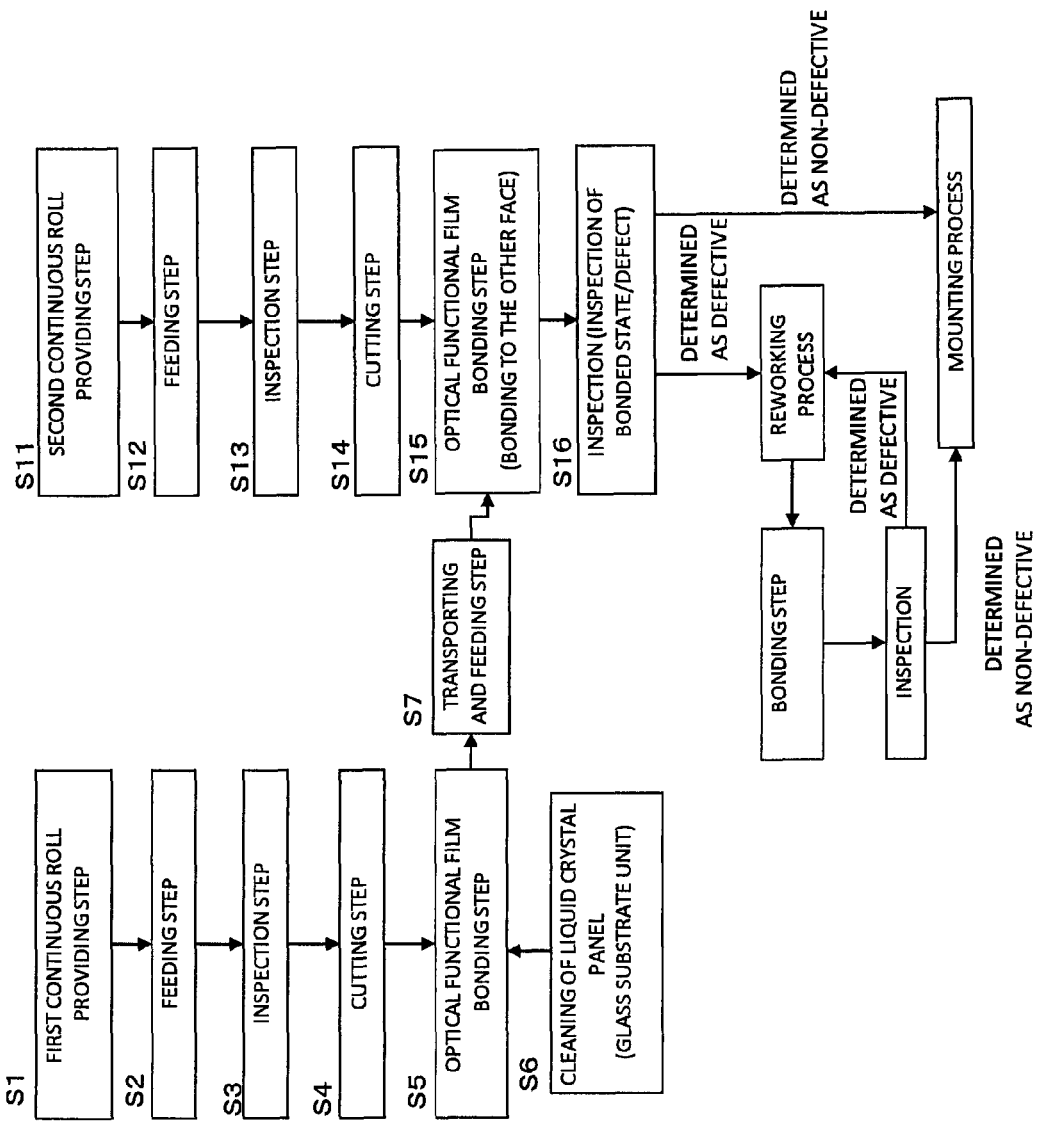

[Fig.6]
(a)
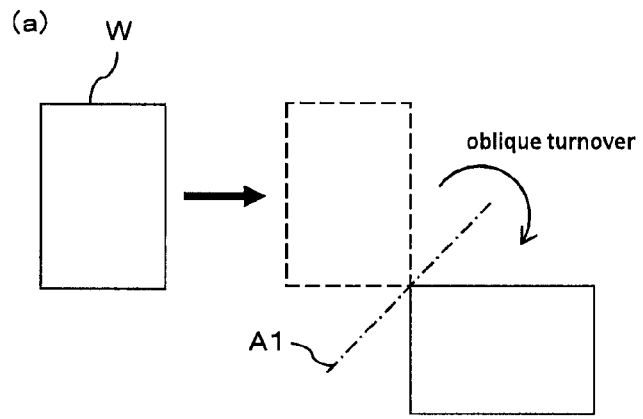
(b)
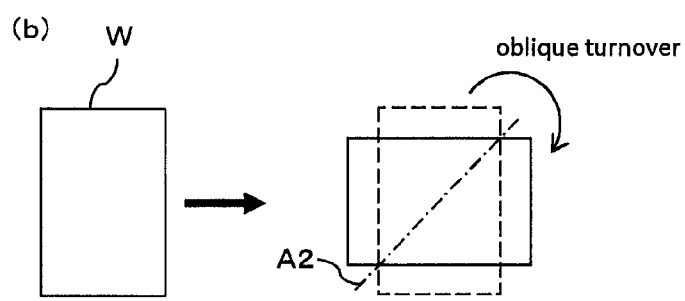
(c)
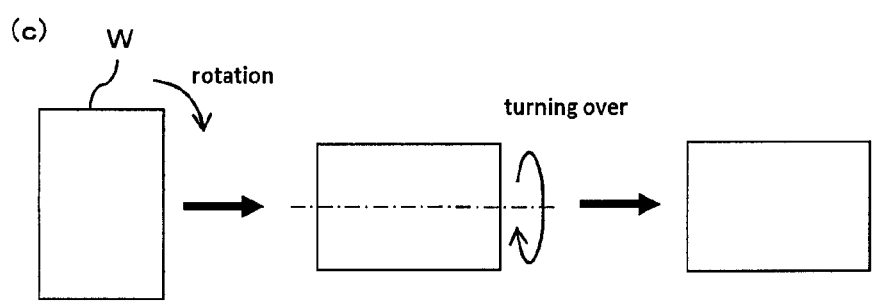
(d)
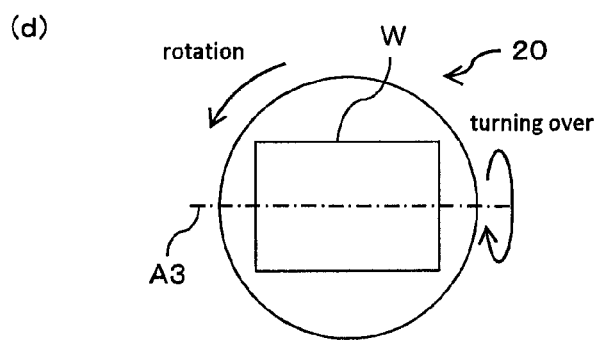

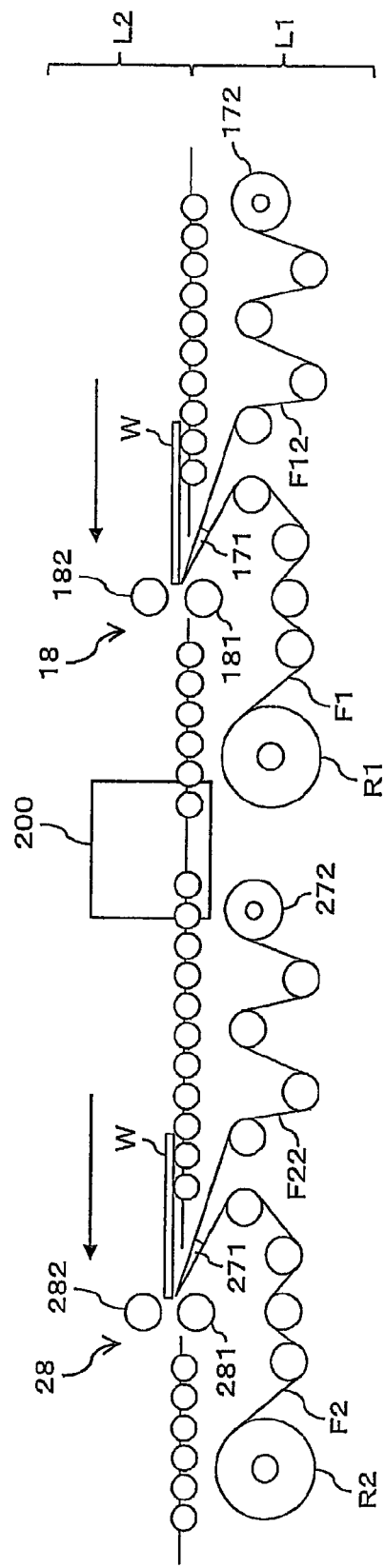

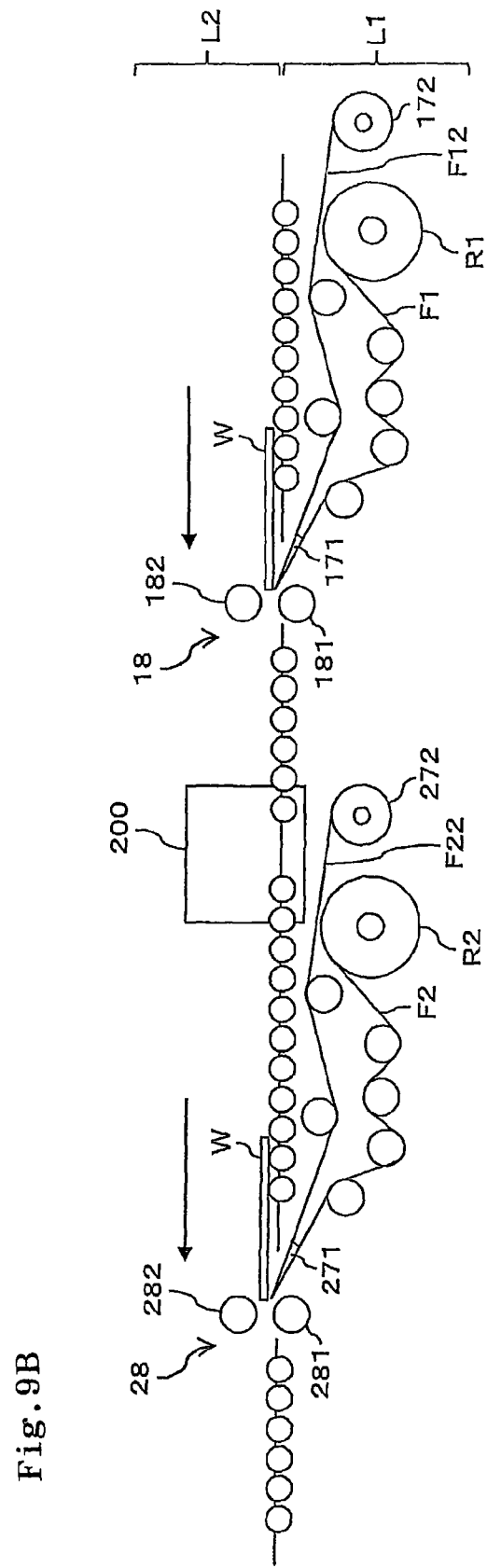

SYSTEM FOR MANUFACTURING LIQUID CRYSTAL DISPLAY DEVICE

TECHNICAL FIELD

The invention relates to a liquid crystal display device manufacturing system including liquid crystal display device manufacturing apparatuses that each have a panel feeding line for feeding a liquid crystal panel linearly in planar view and are arranged parallel to one another for processing liquid crystal panels with continuous rolls. In particular, the invention relates to a technique useful for arranging, parallel to one another, apparatuses for bonding sheet pieces of optical functional films including polarizing films to both surfaces of a rectangular liquid crystal panel using first and second continuous rolls with different widths.

BACKGROUND ART

Concerning the liquid crystal display device manufacturing apparatuses mentioned above, Patent Document 1 discloses a manufacturing apparatus in which cut pieces of belt-shaped films fed from material rolls are bonded from upper and lower sides to a substrate (liquid crystal panel) fed linearly in planar view. Patent Document 1 also discloses that the material rolls are placed at set locations and new material rolls are introduced into the set locations from the side thereof.

In a manufacturing system, a plurality of liquid crystal display device manufacturing apparatuses each having such a linear line structure and a material roll introduction part provided at the side of the line may be arranged parallel to one another in such a manner that the panel feeding lines are arranged in the same direction. In such a manufacturing system, the plurality of manufacturing apparatuses are essentially the same in design, and therefore, the material roll introduction parts do not face each other.

In such a manufacturing system, therefore, the material roll introduction part is placed at every aisle between the manufacturing apparatuses arranged parallel to each other, so that every aisle serves as a material roll feed path. In addition, when a working path for operation or maintenance is provided on the opposite side from the material roll introduction part or on the same side as the material roll introduction part, every aisle serves as a working path.

PRIOR ART DOCUMENT

Patent Document

Patent Document 1: Japanese Patent Application Laid-Open (JP-A) No. 2005-37417

SUMMARY OF THE INVENTION

Problems to be Solved by the Invention

However, when the material roll feed path and the working path are located in the same aisle, the aisle needs to have a sufficient width so that safety and workability can be ensured, which causes the problem of a reduction in the productivity per space for installation of manufacturing equipment.

Particularly when automated apparatuses are used to feed the material rolls, automated apparatuses with a corresponding number of the manufacturing apparatuses are necessary, which causes the disadvantage of an increase in equipment cost.

The invention has been made under the circumstances described above, and an object of the invention is to provide a liquid crystal display device manufacturing system having high productivity per space for installation of manufacturing equipment and making it possible to increase safety by separation of a feed path and a working path and to reduce equipment cost.

Means for Solving the Problems

An embodiment of the invention is directed to a system for manufacturing a liquid crystal display device, which includes at least one pair of liquid crystal display device manufacturing apparatuses that are arranged parallel to one another and each has a linear line structure and each comprises: a film feeding line arranged to feed an optical functional film linearly in planar view from a continuous roll; a panel feeding line that is placed above or below the film feeding line in an overlapping manner and arranged to feed a liquid crystal panel linearly in planar view; and a part for introducing the continuous roll, wherein the part is provided at one side of the film feeding line, wherein the panel feeding lines in the pair of manufacturing apparatuses are arranged in the same direction, and the part for introducing the continuous roll in one of the manufacturing apparatuses and the part for introducing the continuous roll in another of the manufacturing apparatuses are placed on one same side located inside or outside a pair of the film feeding lines.

As used herein, the expression "feed . . . linearly in planar view" means that in planar view, the object is fed along a straight line with its transverse movement (movement in a direction perpendicular to the straight line) being sufficiently small relative to its feed length along the straight line, which is intended to also include such a state that in planar view, the object is fed through a serpentine feed path along a straight line and such a state that the object is fed through a feed path that is composed of plural linear feed lines connected along a straight line and displaced in the transverse direction so that the object can be continuously transported while being shifted in the transverse direction of the line.

In the manufacturing system of the invention, the continuous roll introduction parts of one and another of the manufacturing apparatuses are placed on one same side located inside or outside a pair of the film feeding lines, so that there is no need to form a continuous roll feed path and a working path in the same aisle, which makes it possible to increase the productivity per space for installation of manufacturing equipment. At the same time, the separation of a feed path and a working path can ensure a high level of safety.

The parts for introducing the continuous rolls in the pair of manufacturing apparatuses are preferably placed inside a pair of the film feeding lines.

In such a manufacturing system according to the invention, the continuous rolls can be introduced into each of the pair of manufacturing apparatuses through a feed path provided between the pair of manufacturing apparatuses, so that the productivity per space for installation of manufacturing equipment can be further increased. Particularly when the continuous rolls are fed using an automated apparatus, the pair of manufacturing apparatuses can be operated using the same automated apparatus, which makes it possible to reduce the equipment cost.

The pair of manufacturing apparatuses may each be a linear line structure apparatus for manufacturing a liquid crystal display device by a process including feeding optical functional films from first and second continuous rolls with different widths, respectively, which are each formed by winding, into a roll, a long optical functional film including a polarizing film, transversely cutting the optical functional films to form sheet pieces of the optical functional films, and bonding the sheet pieces to both surfaces of a rectangular liquid crystal panel, in which the film feeding line may be arranged to feed the optical functional films from the first and second continuous rolls in such a manner that the optical functional films being fed are linearly aligned with each other in planar view; the film feeding line may have, at one side, a part for introducing the first continuous roll and a part for introducing the second continuous roll; the first continuous roll introducing part of one of the manufacturing apparatuses and the first continuous roll introducing part of another of the manufacturing apparatuses may be placed on one same side located inside or outside a pair of the film feeding lines; and the second continuous roll introducing part of one of the manufacturing apparatuses and the second continuous roll introducing part of another of the manufacturing apparatuses may be placed on one same side located inside or outside a pair of the film feeding lines.

Such a manufacturing system according to an embodiment of the invention makes it possible to further increase the productivity per space for installation of the apparatus for manufacturing a liquid crystal display device by a process including feeding optical functional films from first and second continuous rolls, respectively.

The panel feeding line may be placed above the film feeding line in an overlapping manner, and the panel feeding line may be provided with a panel turning unit for turning over and horizontally rotating the liquid crystal panel so that bonding one sheet piece of the optical functional film to the lower side of the liquid crystal panel placed on the panel feeding line can be followed by bonding another sheet piece of the optical functional film to the lower side of the liquid crystal panel.

In such a manufacturing system according to an embodiment of the invention, the panel feeding line is placed above the film feeding line, and the optical functional films fed from the first and second continuous rolls are both bonded from the lower side to the liquid crystal panel, so that foreign matter can be prevented from falling on the bonding surface of the liquid crystal panel, which ensures successful bonding.

The panel feeding line may be placed above the film feeding line in an overlapping manner, and the panel feeding line may be provided with a panel turning unit for turning over the liquid crystal panel about a single axis neither parallel to a long side of the liquid crystal panel nor to a short side of the liquid crystal panel so that the positional relationship between the long and short sides of the liquid crystal panel can be reversed and so that bonding one sheet piece of the optical functional film to the lower side of the liquid crystal panel placed on the panel feeding line can be followed by bonding another sheet piece of the optical functional film to the lower side of the liquid crystal panel.

In such a manufacturing system according to an embodiment of the invention, the panel feeding line is placed above the film feeding line, and the optical functional films fed from the first and second continuous rolls are both bonded from the lower side to the liquid crystal panel, so that foreign matter can be prevented from falling on the bonding surface of the liquid crystal panel, which ensures successful bonding.

In particular, the same effect can be achieved by a single operation as in the case where the liquid crystal panel is turned over and horizontally rotated, independently. Therefore, the length of the panel turning unit can be made shorter and therefore the installation space can be made smaller. This advantageous effect will be more remarkable when the liquid crystal display is horizontally upsized.

The liquid crystal display device manufacturing apparatuses may each be an apparatus for manufacturing a liquid crystal display device by a process including feeding optical functional films and carrier films from first and second continuous rolls with different widths, respectively, which are each formed by winding, into a roll, a laminate including a carrier film and a long optical functional film including a polarizing film, transversely cutting the optical functional films with the carrier film left uncut to form sheet pieces of the optical functional films, peeling off the sheet pieces of the optical functional films from the carrier films, and bonding the sheet pieces to both surfaces of a rectangular liquid crystal panel, in which the film feeding line is preferably provided with first and second take-up rolls for taking up the carrier films fed from the first and second continuous rolls, respectively, and separated from the sheet pieces of the optical functional films; the first take-up roll and the first continuous roll are preferably arranged in this order along a direction parallel to the direction of feeding of the liquid crystal panel in the panel feeding line; and the second take-up roll and the second continuous roll are preferably arranged in this order along a direction parallel to the direction of feeding of the liquid crystal panel in the panel feeding line.

In such a manufacturing system according to an embodiment of the invention, the optical functional film can be fed at the same level from the first continuous roll as the level where the carrier film is wound around the first take-up roll, and the optical functional film can also be fed at the same level from the second continuous roll as the level where the carrier film is wound around the second take-up roll. This facilitates attaching and detaching the continuous rolls and the take-up rolls. For example, when an automated apparatus is used to attach and detach the continuous rolls and the take-up rolls, there is no need to control the level of the automated apparatus, which increases workability.

The pair of manufacturing apparatuses may have a linear line structure apparatus for manufacturing a liquid crystal display device by a process including feeding sheet pieces of optical functional films and carrier films from first and second continuous rolls with different widths, respectively, which are each formed by winding, into a roll, a laminate comprising a carrier film and sheet pieces of an optical functional film including a polarizing film, peeling off the sheet pieces of the optical functional films from the carrier films, and bonding the sheet pieces to both surfaces of a rectangular liquid crystal panel, in which the film feeding line may be arranged to feed the optical functional films from the first and second continuous rolls in such a manner that the optical functional films being fed are linearly aligned with each other in planar view; the film feeding line may have, at one side, a part for introducing the first continuous roll and a part for introducing the second continuous roll; the first continuous roll introducing part of one of the manufacturing apparatuses and the first continuous roll introducing part of another of the manufacturing apparatuses may be placed on one same side located inside or outside a pair of the film feeding lines; and the second continuous roll introducing part of one of the manufacturing apparatuses and the second continuous roll introducing part of another of the manufacturing apparatuses may be placed on one same side located inside or outside a pair of the film feeding lines.

Such a manufacturing system according to an embodiment of the invention makes it possible to further increase the productivity per space for installation of the apparatus for manufacturing a liquid crystal display device by a process including feeding optical functional films from first and second continuous rolls, respectively.

The panel feeding line may be placed above the film feeding line in an overlapping manner, and the panel feeding line may be provided with a panel turning unit for turning over and horizontally rotating the liquid crystal panel so that bonding one sheet piece of the optical functional film to the lower side of the liquid crystal panel placed on the panel feeding line can be followed by bonding another sheet piece of the optical functional film to the lower side of the liquid crystal panel.

In such a manufacturing system according to an embodiment of the invention, the panel feeding line is placed above the film feeding line, and the optical functional films fed from the first and second continuous rolls are both bonded from the lower side to the liquid crystal panel, so that foreign matter can be prevented from falling on the bonding surface of the liquid crystal panel, which ensures successful bonding.

The panel feeding line may be placed above the film feeding line in an overlapping manner, and the panel feeding line may be provided with a panel turning unit for turning over the liquid crystal panel about a single axis neither parallel to a long side of the liquid crystal panel nor to a short side of the liquid crystal panel so that the positional relationship between the long and short sides of the liquid crystal panel can be reversed and so that bonding one sheet piece of the optical functional film to the lower side of the liquid crystal panel placed on the panel feeding line can be followed by bonding another sheet piece of the optical functional film to the lower side of the liquid crystal panel.

In such a manufacturing system according to an embodiment of the invention, the panel feeding line is placed above the film feeding line, and the optical functional films fed from the first and second continuous rolls are both bonded from the lower side to the liquid crystal panel, so that foreign matter can be prevented from falling on the bonding surface of the liquid crystal panel, which ensures successful bonding.

In particular, the same effect can be achieved by a single operation as in the case where the liquid crystal panel is turned over and horizontally rotated, independently. Therefore, the length of the panel turning unit can be made shorter and therefore the installation space can be made smaller. This advantageous effect will be more remarkable when the liquid crystal display is horizontally upsized.

The film feeding line is preferably provided with first and second take-up rolls for taking up the carrier films fed from the first and second continuous rolls, respectively, and separated from the sheet pieces of the optical functional films; the first take-up roll and the first continuous roll are preferably arranged in this order along a direction parallel to the direction of feeding of the liquid crystal panel in the panel feeding line; and the second take-up roll and the second continuous roll are preferably arranged in this order along a direction parallel to the direction of feeding of the liquid crystal panel in the panel feeding line.

In such a manufacturing system according to an embodiment of the invention, the optical functional film can be fed at the same level from the first continuous roll as the level where the carrier film is wound around the first take-up roll, and the optical functional film can also be fed at the same level from the second continuous roll as the level where the carrier film is wound around the second take-up roll. This facilitates attaching and detaching the continuous rolls and the take-up rolls. For example, when an automated apparatus is used to attach and detach the continuous rolls and the take-up rolls, there is no need to control the level of the automated apparatus, which increases workability.

The first continuous roll introducing parts in the pair of manufacturing apparatuses are preferably provided so that the first continuous rolls can be placed at the same level, and the second continuous roll introducing parts in the pair of manufacturing apparatuses are also preferably provided so that the second continuous rolls can be placed at the same level.

In such a manufacturing system according to an embodiment of the invention, the first continuous rolls can be attached and detached at the same level, respectively, to and from the first continuous roll introducing parts in the pair of manufacturing apparatuses, and the second continuous rolls can also be attached and detached at the same level, respectively, to and from the second continuous roll introducing parts in the pair of manufacturing apparatuses. Therefore, the first and second continuous rolls can be easily attached and detached. For example, when an automated apparatus is used to attach and detach the first and second continuous rolls, there is no need to control the level of the automated apparatus in each of the attachment/detachment of the first and second continuous rolls in the pair of manufacturing apparatuses, which increases workability.

The first continuous roll introducing parts and the second continuous roll introducing parts in the pair of manufacturing apparatuses are preferably provided so that the first and second continuous rolls can be placed at a level lower than the level of the panel feeding lines.

In such a manufacturing apparatus according to an embodiment of the invention, the first and second continuous rolls, which are heavy materials, do not need to be lifted to a higher level, which improves safety.

BRIEF DESCRIPTION OF DRAWINGS

FIG. 1 is a flow chart showing an example of the liquid crystal display device manufacturing method according to an embodiment of the invention;

FIG. 6 is a schematic diagram showing specific examples of the liquid crystal panel turning method;

FIG. 9A is a schematic side view showing another example of the arrangement of continuous rolls and take-up rolls; and FIG. 9B is a schematic side view showing a further example of the arrangement of continuous rolls and take-up rolls.

EMBODIMENTS FOR CARRYING OUT THE INVENTION

Figure 2A:
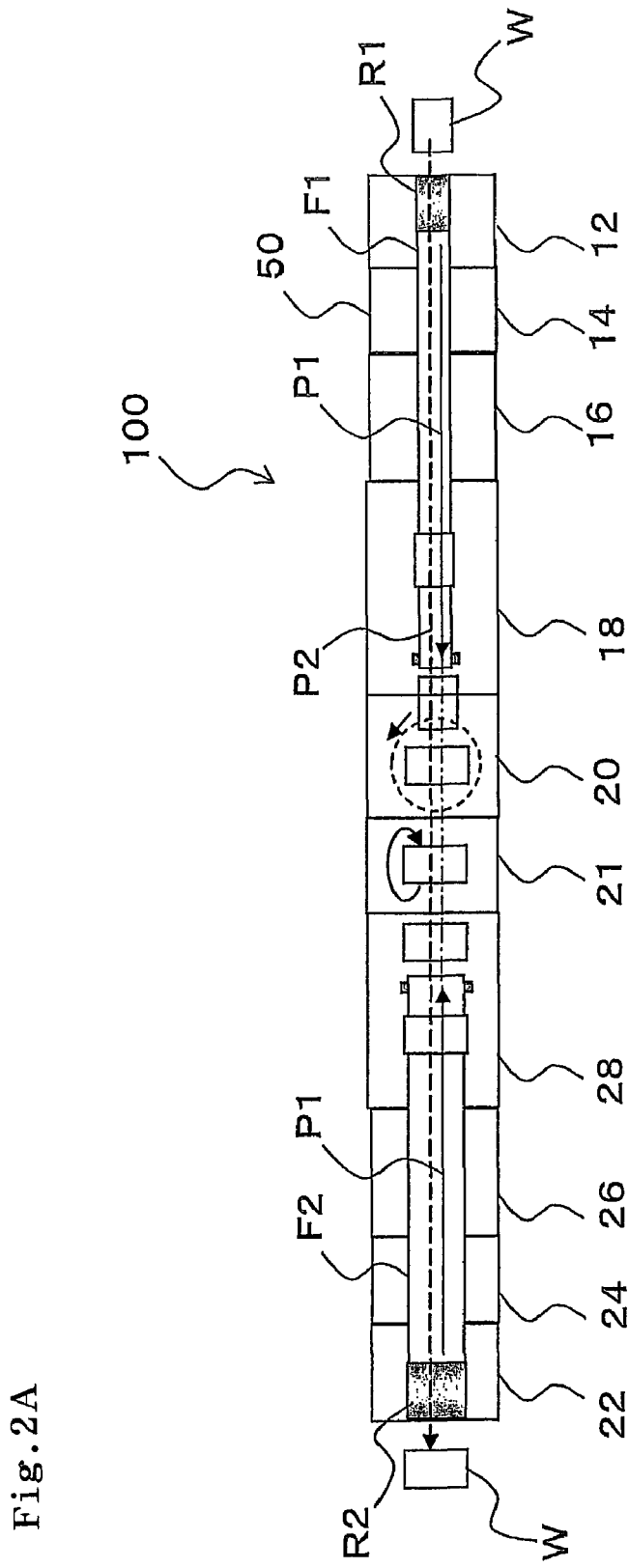
FIG. 2A is a schematic plan view showing a typical manufacturing apparatus used in the liquid crystal display device manufacturing system.
Figure 2B:
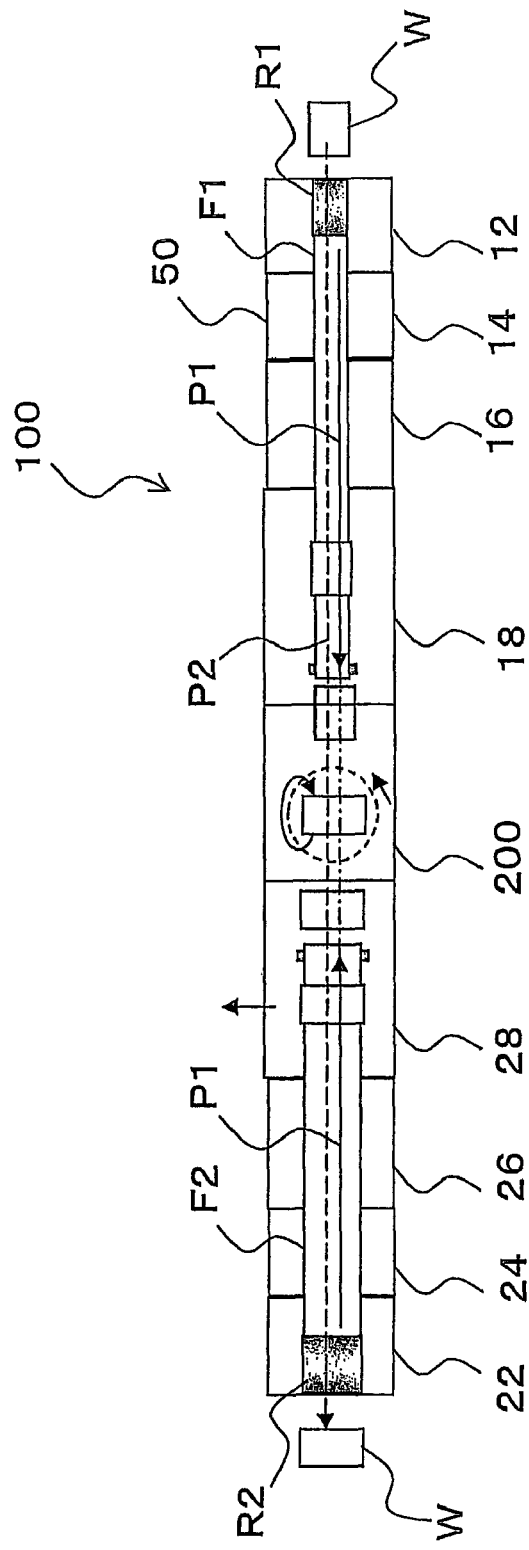
FIG. 2B is a schematic plan view showing another typical manufacturing apparatus used in the liquid crystal display device manufacturing system.
Figure 3:
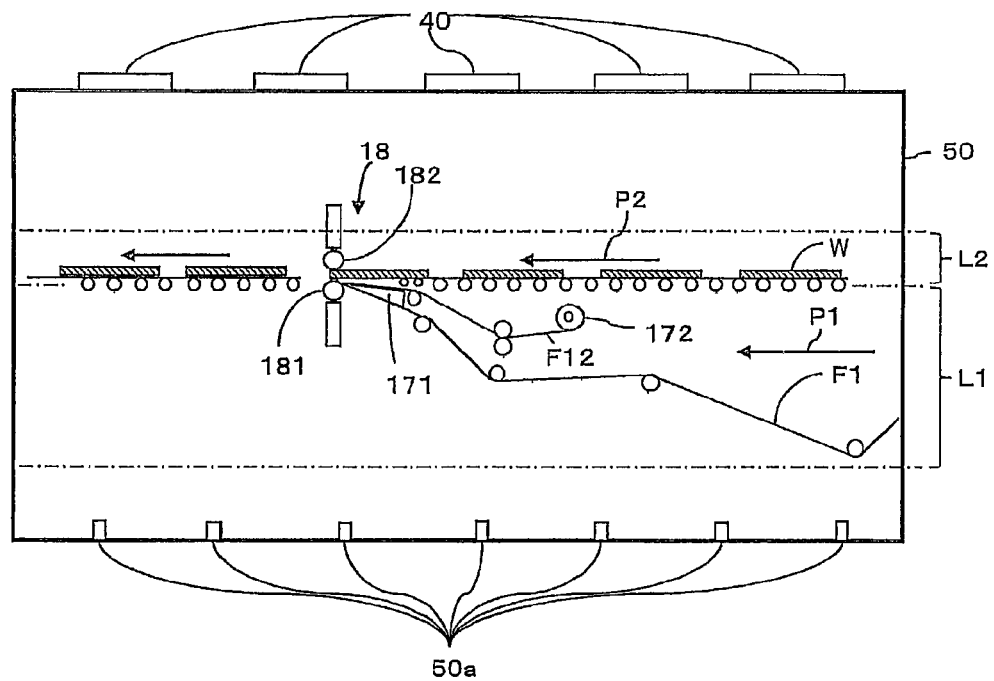
FIG. 3 is a schematic side view showing a process of bonding a first optical functional film to a liquid crystal panel.
Figure 4:
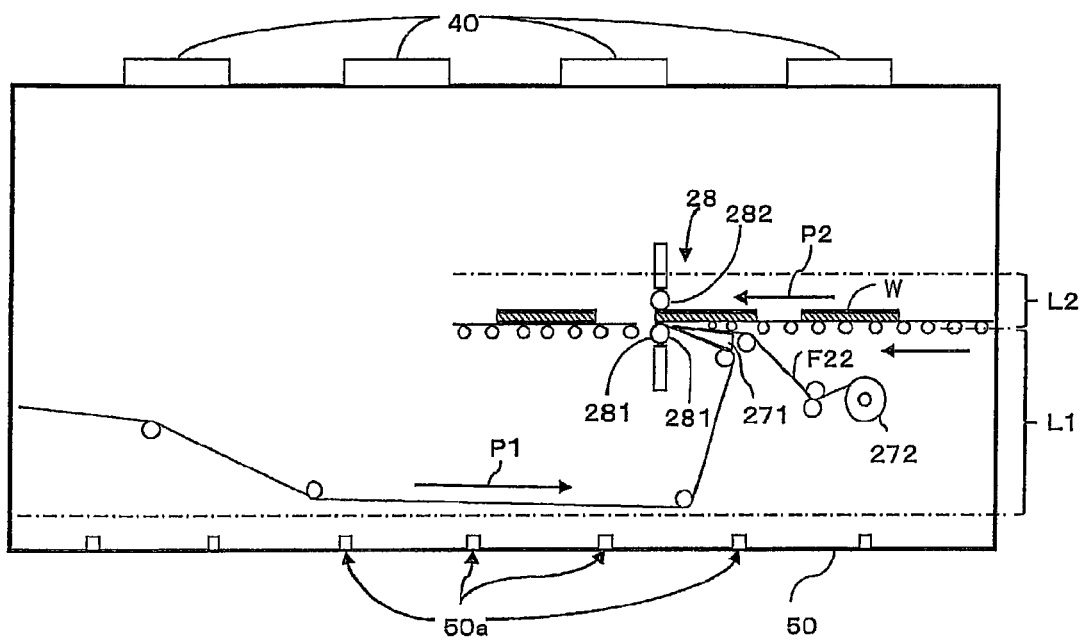
FIG. 4 is a schematic side view showing a process of bonding a second optical functional film to the liquid crystal panel.

FIG. 1 is a flow chart showing an example of the liquid crystal display device manufacturing method according to an embodiment of the invention. FIG. 2A is a schematic plan view showing a typical manufacturing apparatus 100 used in the liquid crystal display device manufacturing system. FIG. 2B is a schematic plan view showing another typical manufacturing apparatus 100 used in the liquid crystal display device manufacturing system. FIG. 3 is a schematic side view showing a process of bonding a first optical functional film F11 to a liquid crystal panel W. FIG. 4 is a schematic side view showing a process of bonding a second optical functional film F21 to the liquid crystal panel W.

Liquid Crystal Panel

The liquid crystal panel W for use in the liquid crystal display element manufactured according to the invention is typically a glass substrate unit including a pair of glass substrates and a liquid crystal placed therebetween. The liquid crystal panel W has a rectangular shape.

Optical Functional Film

The optical functional film for use in the liquid crystal display element manufactured according to the invention includes a polarizing film. A pressure-sensitive adhesive layer is formed on one side of the optical functional film so that it can be bonded to the liquid crystal panel W, and a carrier film for protecting the pressure-sensitive adhesive layer is also provided thereon. Namely, the optical functional film, the pressure-sensitive adhesive layer, and the carrier film are stacked in this order. A surface protecting film is provided on the other side of the optical functional film with a pressure-sensitive adhesive layer interposed therebetween. Hereinafter, the laminate of the surface protecting film, the optical functional film, and the carrier film is also referred to as an optical film laminate.

Figure 5:
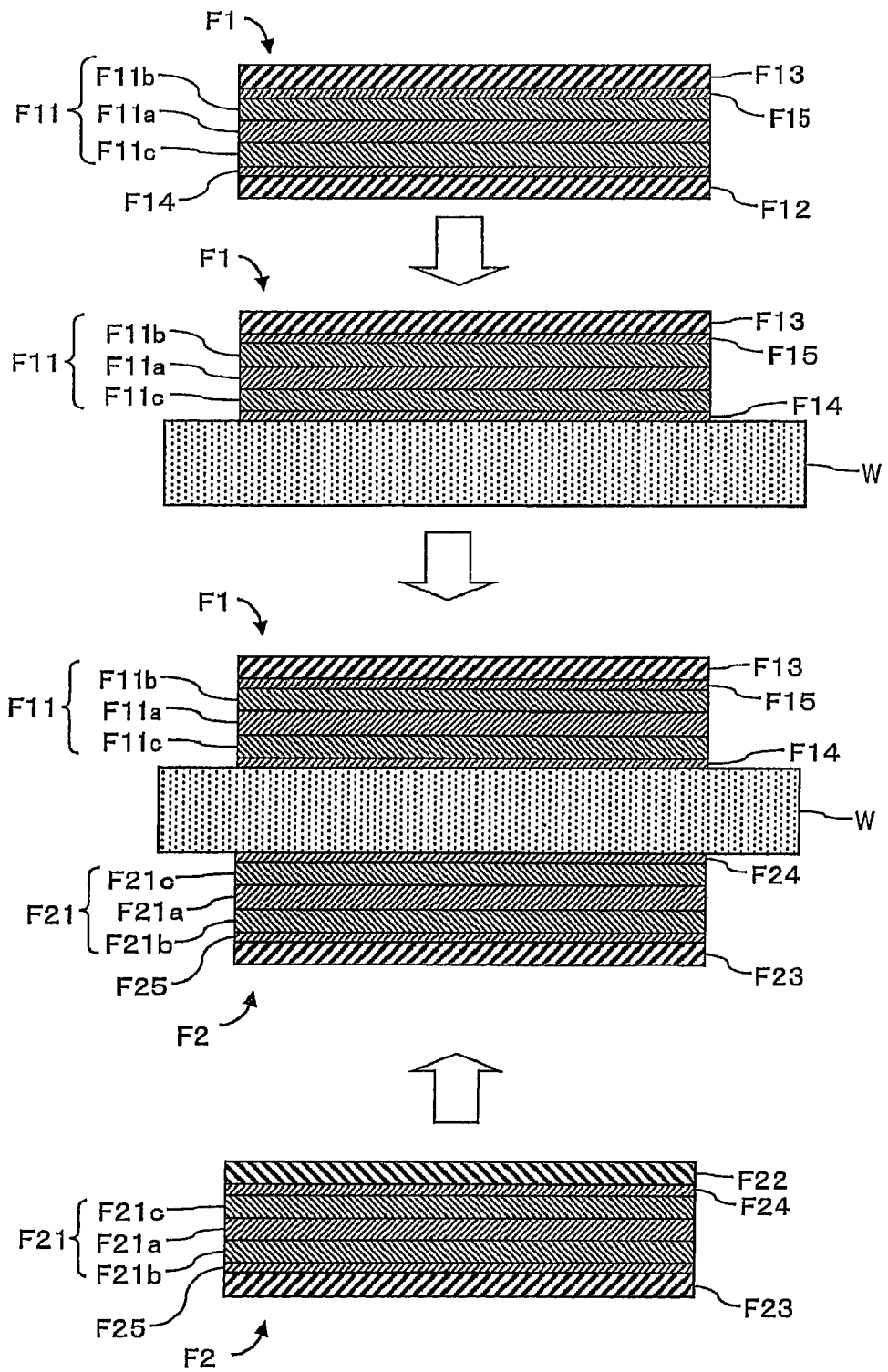
FIG. 5 is a cross-sectional view showing an example of the process of bonding optical functional films to a liquid crystal panel.

FIG. 5 is a cross-sectional view showing an example of the process of bonding the optical functional film to the liquid crystal panel W. In this embodiment, first and second optical film laminates F1 and F2 are used. The first optical film laminate F1 includes a first optical functional film F11 which is to be bonded to one surface of the liquid crystal panel W, and the second optical film laminate F2 includes a second optical functional film F21 which is to be bonded to the other surface of the liquid crystal panel W.

The first optical film laminate F1 has a structure in which the first optical functional film F11, a first carrier film F12 and a surface protecting film F13 are stacked. In this embodiment, the first optical functional film F11 includes a polarizing film. The first optical functional film F11 includes a first polarizer F11a, a first film F11b bonded to one side thereof with an adhesive layer (not shown) interposed therebetween, and a second film F11c bonded to the other side thereof with an adhesive layer (not shown) interposed therebetween. The first polarizer F11a is typically formed by stretching a polyvinyl alcohol (PVA) film. It will be understood that the first polarizer F11a may be formed using any other film than the polyvinyl alcohol film.

The first and second films F11b and F11c are each typically a protective film (such as a triacetylcellulose film or a PET film). The second film F11c will be bonded to the liquid crystal panel W with a first pressure-sensitive adhesive layer F14 interposed therebetween. The first film F11b may be subjected to a surface treatment. For example, the surface treatment may be a hard coating treatment, an antireflection treatment, or a treatment for any other purpose such as an anti-sticking, diffusion, or antiglare purpose. The first carrier film F12 is bonded to the second film F11c with the first pressure-sensitive adhesive layer F14 interposed therebetween. The surface protecting film F13 is bonded to the first film F11b with a pressure-sensitive adhesive layer F15 interposed therebetween.

The laminated structure of the second optical film laminate F2 is the same as, but not limited to, that of the first optical film laminate F1. The second optical film laminate F2 has a structure in which a second optical functional film F21, a second carrier film F22, and a surface protecting film F23 are stacked. In this embodiment, the second optical functional film F21 includes a polarizing film. The second optical functional film F21 includes a second polarizer F21a, a third film F21b bonded to one side thereof with an adhesive layer (not shown) interposed therebetween, and a fourth film F21c bonded to the other side thereof with an adhesive layer (not shown) interposed therebetween. The second polarizer F21a is typically formed by drying a polyvinyl alcohol (PVA) film. It will be understood that the second polarizer F21a may be formed using any other film than the polyvinyl alcohol film.

The third and fourth films F21b and F21c are each typically a protective film (such as a triacetylcellulose film or a PET film). The fourth film F21c will be bonded to the liquid crystal panel W with a second pressure-sensitive adhesive layer F24 interposed therebetween. The third film F21b may be subjected to a surface treatment. For example, the surface treatment may be a hard coating treatment, an antireflection treatment, or a treatment for any other purpose such as an anti-sticking, diffusion, or antiglare purpose. The second carrier film F22 is bonded to the fourth film F21c with the second pressure-sensitive adhesive layer F24 interposed therebetween. The surface protecting film F23 is bonded to the third film F21b with a pressure-sensitive adhesive layer F25 interposed therebetween.

Manufacturing Flow Chart (1) Step of Providing First Continuous Roll (S1 in FIG. 1). A first continuous roll R1 is provided which is formed by winding a first long optical film laminate F1 into a roll. The first continuous roll R1 is a raw material for the processing of the liquid crystal panel W. The first continuous roll R1 has a width depending on the size of the liquid crystal panel W to be bonded. Specifically, the first continuous roll R1 is formed by winding, into a roll, a first optical film laminate F1 including a first optical functional film F11 with a width corresponding to the short or long side of the liquid crystal panel W. More specifically, the first continuous roll R1 is formed by winding, into a roll, the first long optical film laminate F1 that is obtained by slitting, into a width corresponding to the short or long side of the liquid crystal panel W, a long material including the first optical functional film F11, the first pressure-sensitive adhesive layer F14, and the first carrier film F12 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the first optical film laminate F1 formed can have an absorption axis extending along the longitudinal direction with high accuracy. In this embodiment, the first continuous roll R1 used has a width corresponding to the short side of the liquid crystal panel W.

(2) Step of Feeding First Optical Functional Film (S2 in FIG. 1). A first feeder 12 draws and feeds the first optical film laminate F1 including the first optical functional film F11 to the downstream side from the first continuous roll R1 provided and placed. The first optical film laminate F1 is fed from the first continuous roll R1 linearly in planar view.

(3) First Inspection Step (S3 in FIG. 1). The first optical film laminate F1 is inspected for defects using a first defect inspection apparatus 14. In this step, the defect inspection method may be a method of performing imaging and image processing on both sides of the first optical film laminate F1 with transmitted light or reflected light, a method of performing imaging and image processing with a polarizing film for inspection arranged in a crossed nicols relationship (also referred to as "0° cross") with the polarization axis of the polarizing film (the object to be inspected) between a CCD camera and the object, or a method of performing imaging and image processing with a polarizing film for inspection arranged at a certain angle (for example, in the range of more than 0° to 10°, also referred to as "X° cross") with the polarization axis of the polarizing film (the object to be inspected) between a CCD camera and the object. Known methods may be used for the image processing algorithm. For example, defects may be detected by grayscale determination based on binarization.

Defect information detected by the first defect inspection apparatus 14 is associated with the positional information (such as position coordinates) and sent to a controller so that it can contribute to the cutting process with a first cutting apparatus 16.

(4) First Cutting Step (S4 in FIG. 1). The first cutting apparatus 16 cuts, in the transverse direction, at least the first optical functional film F11 of the first optical film laminate F1 drawn from the first continuous roll R1, so that a sheet piece of the first optical functional film F11 is formed. In this example, while the first carrier film F12 is left uncut, the first optical functional film F11, to which the first carrier film F12 is attached, and the surface protecting film F13, to which the first optical functional film F11 is attached, are cut into a predetermined size. It will be understood that such a process is non-limiting, and alternatively, for example, the first optical film laminate F1 may be cut completely so that a piece of the first optical film laminate F1 can be formed. For example, the cutting means may be a laser, a cutter, or the like. The cutting is preferably performed based on the defect information detected by the first defect inspection apparatus 14 so that defects can be avoided. This significantly increases the first optical film laminate F1 yield. Defective parts of the first optical film laminate F1 are removed by a first removing apparatus (not shown) so as not to be bonded to the liquid crystal panel W. In this embodiment, the first optical functional film F11 is cut into a length corresponding to the long side of the liquid crystal panel W. Alternatively, however, it may be cut into a length corresponding to the short side of the liquid crystal panel W when the first continuous roll R1 has a width corresponding to the long side of the liquid crystal panel W.

All of the step of providing the first continuous roll, the first inspection step, and the first cutting step are preferably performed in a continuous manufacturing line. In the above series of manufacturing steps, a sheet piece of the first optical functional film F11 is formed, which is to be bonded to one surface of the liquid crystal panel W. A description is given below of a process of forming a sheet piece of the second optical functional film F21 to be bonded to the other surface of the liquid crystal panel W.

(5) Step of Providing Second Continuous Roll (S11 in FIG. 1). A second continuous roll R2 is provided which is formed by winding a second long optical film laminate F2 into a roll. The second continuous roll R2 is another raw material for the processing of the liquid crystal panel W. The second continuous roll R2 has a width depending on the size of the liquid crystal panel W to be bonded. Specifically, the second continuous roll R2 is formed by winding, into a roll, a second optical film laminate F2 including a second optical functional film F21 with a width corresponding to the long or short side of the liquid crystal panel W. More specifically, the second continuous roll R2 is formed by winding, into a roll, the second long optical film laminate F2 that is obtained by slitting, into a width corresponding to the long or short side of the liquid crystal panel W, a long material including the second optical functional film F21, the second pressure-sensitive adhesive layer F24, and the second carrier film F22 stacked in this order. The polarizing film as a component of the long material is preferably formed through stretching in the longitudinal direction, and in such a case, the absorption axis of the polarizing film is formed along the longitudinal direction. Such a long material should be slit parallel to the longitudinal direction so that the second optical film laminate F2 formed can have an absorption axis extending along the longitudinal direction with high accuracy. The second continuous roll R2, for example, is typically formed with a width different from that of the first continuous roll R1. Specifically, when the first continuous roll R1 is formed with a width corresponding to the long side of the liquid crystal panel W, the second continuous roll R2 is formed with a width corresponding to the short side of the liquid crystal panel W, and when the first continuous roll R1 is formed with a width corresponding to the short side of the liquid crystal panel W, the second continuous roll R2 is formed with a width corresponding to the long side of the liquid crystal panel W. In this embodiment, the second continuous roll R2 used has a width corresponding to the long side of the liquid crystal panel W. As used herein, the expression "corresponding to the long or short side of the liquid crystal panel W" means that the bonding length of the optical functional film F11 or F21 (exclusive of the length of the exposed portion) will correspond to the length of the long or short side of the liquid crystal panel W and does not mean that the width of the optical functional film F11 or F21 has to be equal to the length of the long or short side of the liquid crystal panel W.

(6) Step of Feeding Second Optical Functional Film (S12 in FIG. 1). A second feeder 22 draws and feeds the second optical film laminate F2 including the second optical functional film F21 to the downstream side from the second continuous roll R2 provided and placed. The second optical film laminate F2 is fed from the second continuous roll R2 linearly in planar view. More specifically, as shown in FIGS. 2A and 2B, the first and second optical film laminates F1 and F2 are fed from the first and second continuous rolls R1 and R2, respectively, on first linear feed paths P1 whose extended lines overlap each other in planar view (the film feeding step). The first and second optical film laminates F1 and F2 may be fed in directions opposite to each other or in the same direction on the first linear feed paths P1. In this embodiment, the liquid crystal display device manufacturing apparatus 100 includes film feeding lines L1 that are arranged so that the first and second optical film laminates F1 and F2 being fed can be linearly aligned with each other in planar view as described above (see FIGS. 3 and 4).

(7) Second Inspection Step (S13 in FIG. 1). The second optical film laminate F2 is inspected for defects using a second defect inspection apparatus 24. In this step, the defect inspection method is the same as the above method with the first defect inspection apparatus 14. However, the first inspection step (S3) and the second inspection step (S13) may be omitted. In such a case, the first and second optical film laminates F1 and F2 may be inspected for defects in a stage where the first and second continuous rolls R1 and R2 are manufactured, and liquid crystal display elements may be manufactured using the first and second continuous rolls R1 and R2 to which the defect information detected by the defect inspection has been attached.

(8) Second Cutting Step (S14 in FIG. 1). A second cutting apparatus 26 cuts, in the transverse direction, at least the second optical functional film F21 of the second optical film laminate F2 drawn from the second continuous roll R2, so that a sheet piece of the second optical functional film F21 is formed. In this example, while the second carrier film F22 is left uncut, the second optical functional film F21, to which the second carrier film F22 is attached, and the surface protecting film F23, to which the second optical functional film F21 is attached, are cut into a predetermined size. It will be understood that such a process is non-limiting, and alternatively, for example, the second optical film laminate F2 may be cut completely so that a piece of the second optical film laminate F2 can be formed. For example, the cutting means may be a laser, a cutter, or the like. The cutting is preferably performed based on the defect information detected by the second defect inspection apparatus 24 so that defects can be avoided. This significantly increases the second optical film laminate F2 yield. Defective parts of the second optical film laminate F2 are removed by a second removing apparatus (not shown) so as not to be bonded to the liquid crystal panel W. In this embodiment, the second optical functional film F21 is cut into a length corresponding to the short side of the liquid crystal panel W. Alternatively, however, it may be cut into a length corresponding to the long side of the liquid crystal panel W when the second continuous roll R2 has a width corresponding to the short side of the liquid crystal panel W.

The step of feeding the liquid crystal panel W is performed in parallel with the step of forming sheet pieces of the first and second optical functional films F11 and F21, respectively. The liquid crystal panel W is subjected to the process described below while it is fed.

(9) Cleaning Step (S6 in FIG. 1). The surface of the liquid crystal panel W is cleaned by polishing cleaning, washing with water, or any other cleaning method. As shown in FIGS. 3 and 4, the liquid crystal panel W having undergone cleaning is fed on a second linear feed path P2 in a panel feeding line L2 that is placed above the film feeding line L1 in an overlapping manner and placed to feed the liquid crystal panels W linearly in planar view (the panel feeding step). The second linear feed path P2 extends at least between first and second bonding apparatuses 18 and 28 and placed parallel to the first linear feed paths P1 so as to at least partially overlap with the first linear feed paths P1 in planar view.

(10) Step of Bonding First Optical Functional Film (S5 in FIG. 1). The cut piece of the first optical functional film F11 (the sheet piece of the first optical functional film F11) is bonded to one surface of the liquid crystal panel W with the pressure-sensitive adhesive layer F14 interposed therebetween by the first bonding apparatus 18, while the first carrier film F12 is peeled off. The first carrier film F12 peeled off by a peeling unit 171 is wound onto a first take-up roll 172. In the bonding, the first optical functional film F11 and the liquid crystal panel W are inserted and press-bonded between a pair of rollers 181 and 182 opposed to each other.

(11) Step of Transporting and Feeing Panel (S7 in FIG. 1). The liquid crystal panel W to which the sheet piece of the first optical functional film F11 has been bonded by the first bonding apparatus 18 is fed to a second bonding apparatus 28 along the second linear feed path P2. The panel feeding line L2 is provided with a panel turning unit for turning the liquid crystal panel W on the second linear feed path P2 after the sheet piece of the first optical functional film F11 is bonded thereto and before a sheet piece of the second optical functional film F21 is bonded thereto. The panel turning unit turns over the liquid crystal panel W and rotates it horizontally by 90° (the panel turning step) to allow the first and second optical functional films F11 and F21 to be bonded in a crossed nicols relationship (in such a relationship that the absorption axes of the polarizing films are perpendicular to each other).

In the example shown in FIG. 2A, the panel turning unit includes a panel rotating mechanism 20 for horizontally rotating the liquid crystal panel W and a panel-turning-over mechanism 21 for turning over the liquid crystal panel W. In other words, it is configured so that turning over the liquid crystal panel W and rotating it horizontally can be performed independently. The panel rotating mechanism 20 and the panel-turning-over mechanism 21 may be placed in any order. On the other hand, the example shown in FIG. 2B includes a panel turning unit 200 that is configured so that turning over the liquid crystal panel W and rotating it horizontally can be performed at the same time.

FIG. 6 is a schematic diagram showing examples of the method of turning the liquid crystal panel W. FIGS. 6(a) and 6(b) show methods of turning over the liquid crystal panel W to achieve a crossed nicols relationship, in which the liquid crystal panel W is turned over (obliquely turned over) about an axis (axis A1 or A2), which is neither parallel to the long side of the liquid crystal panel W nor to the short side of the liquid crystal panel W, so that the positional relationship between the long and short sides of the liquid crystal panel W can be reversed. FIG. 6(a) shows an example where the liquid crystal panel W is turned over about the horizontal axis A1 passing through a corner of the liquid crystal panel W. FIG. 6(b) shows an example where the liquid crystal panel W is turned over about the horizontal axis A2 passing through the center of the liquid crystal panel W. In both of FIGS. 6(a) and 6(b), for example, the axes A1 and A2 are inclined by 45° relative to the feeding direction of the liquid crystal panel W. FIG. 6(c) shows a method of performing turning over and horizontal rotation independently to achieve a crossed nicols relationship, in which turning over and horizontal rotation may be performed in any order. FIG. 6(d) shows a method that includes horizontally rotating the liquid crystal panel W, while turning it over, which is performed using a panel turning unit including a mechanism for rotating the liquid crystal panel W horizontally and a mechanism for turning over the liquid crystal panel W about a horizontal axis A3.

In the example shown in FIG. 6(a), after turned over and horizontally rotated at the same time, the liquid crystal panel W is displaced from the panel feeding line L2, which extends to the panel turning unit 200, in the transverse direction of the panel feeding line L2. In an embodiment of the invention, the displaced liquid crystal panel W being transported may be shifted back to a position on an extension of the initial panel feeding line L2 or may be continuously transported from the displaced position through another part of the feeding line L2 shifted in the transverse direction of the line in the feed path. The latter case corresponds to such an arrangement that the liquid crystal panel W can be transported through a feed path that is composed of plural linear feed lines connected along a straight line and displaced in the transverse direction so that the object can be continuously transported while being shifted in the transverse direction of the line, which falls within the meaning of the expression "arranged . . . linearly ( . . . ) in planar view" used herein.

The operation of the panel turning unit described above makes it possible to reverse the positional relationship between the long and short sides of the liquid crystal panel W. Specifically, the long side of the liquid crystal panel W after the operation is parallel to the short side before the operation, and the short side of the liquid crystal panel W after the operation is parallel to the long side before the operation. It will be understood that the operation of the panel turning unit is not limited to those shown in FIG. 6 and the liquid crystal panel W may be turned in any other manner.

In the embodiment, after the first optical functional film F11 is bonded to the liquid crystal panel W in the first bonding apparatus 18, the liquid crystal panel W is turned to the bonding direction in the second bonding apparatus 28. Alternatively, however, the second optical functional film F21 may be bonded to the liquid crystal panel W before the first optical functional film F11 is bonded thereto as mentioned above. In such a case, after the second optical functional film f21 is bonded to the liquid crystal panel W in the second bonding apparatus 28, the liquid crystal panel W may be turned to the bonding direction in the first bonding apparatus 18.

(12) Step of Bonding Second Optical Functional Film (S15 in FIG. 1). The cut piece of the second optical functional film F21 (the sheet piece of the second optical functional film F21) is bonded to the other surface of the liquid crystal panel W with the pressure-sensitive adhesive layer F24 interposed therebetween by the second bonding apparatus 28, while the second carrier film F22 is peeled off. The second carrier film F22 peeled off by a peeling unit 271 is wound onto a second take-up roll 272. In the bonding, the second optical functional film F21 and the liquid crystal panel W are inserted and press-bonded between a pair of rollers 281 and 282 opposed to each other.

(13) Step of Inspecting Liquid Crystal Panel (S16 in FIG. 1). The liquid crystal panel W with both surfaces bonded to the optical functional films F11 and F12 is inspected using an inspection apparatus. An example of the inspection method is a method of performing imaging and image processing on both sides of the liquid crystal panel W with transmitted light and reflected light. Another example of the method uses a polarizing film for inspection placed between a CCD camera and the object to be inspected. Known methods may be used for the image processing algorithm. For example, defects may be detected by grayscale determination based on binarization.

(14) Defect information detected by the inspection apparatus is used to determine whether the liquid crystal panel W is non-defective. The liquid crystal panel W determined to be non-defective is transferred to the next implementing step. When determined to be defective, it is subjected to a reworking process, in which a new optical functional film F11 or F21 is bonded, and then the product is inspected. The product determined to be non-defective is transferred to the implementing step, but the product determined to be defective is subjected to the reworking process again or to disposal.

In the above series of manufacturing steps, the first optical functional film F11 bonding step and the second optical functional film F21 bonding step may be performed in a continuous manufacturing line, which makes it possible to manufacture the liquid crystal display element in a satisfactory manner.

A description has been given of a method that includes leaving the carrier films F12 and F22 uncut and cutting other components of the optical film laminates F1 and F2 (half-cutting method). However, such a method is non-limiting, and alternatively, for example, continuous rolls having undergone half-cutting may be used, in which sheet pieces of the optical functional films F11 and F21 formed by previously cutting the other components of the optical film laminates F12 and F22 than the carrier films F12 and F22 are held on the carrier films F12 and F22, respectively. In this case, the continuous rolls may be formed by a process that includes slitting a long material into a width corresponding to the short or long side of the rectangular liquid crystal panel W, cutting the optical functional films F11 and F21 and the pressure-sensitive adhesive layers F14 and F24 of the resulting long optical film laminates F1 and F2, respectively, into a length corresponding to the long or short side of the liquid crystal panel W, while leaving the carrier films F12 and F22 uncut, and winding, into rolls, the laminates F1 and F2 having undergone the cutting, respectively. The optical film laminates F1 and F2 are drawn from such continuous rolls, respectively, and the sheet pieces of the optical functional films F11 and F21 are bonded to the surfaces of the liquid crystal panel W with the pressure-sensitive adhesive layers F14 and F24 interposed therebetween, respectively, while the carrier films F12 and F22 are peeled off, so that a liquid crystal display element is manufactured. The optical functional films F11 and F21 do not always have to be bonded after they are cut, and the cutting may be performed during or after the bonding.

Figure 7:
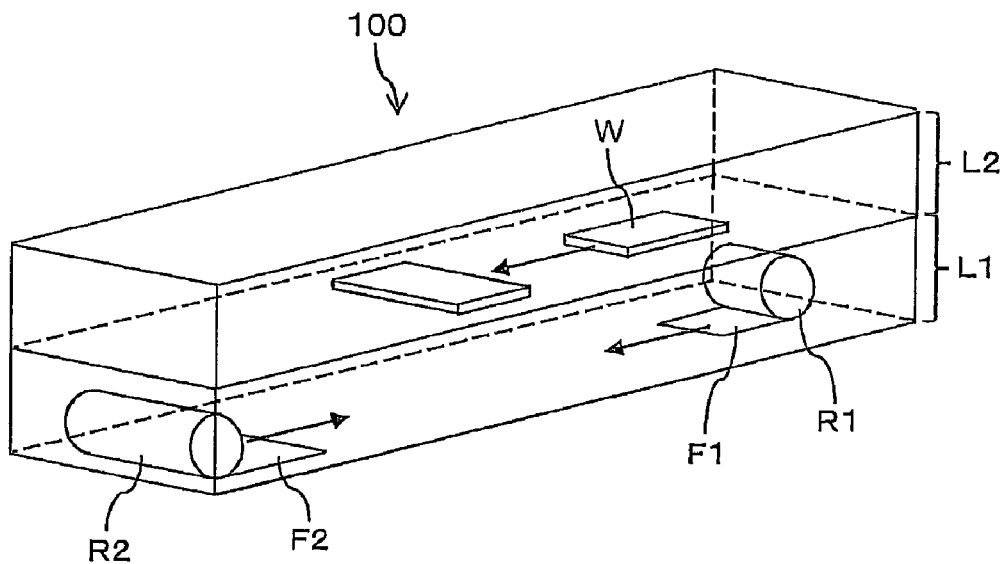
FIG. 7 is a schematic perspective view showing the positional relationship between a film feeding line and a panel feeding line.

FIG. 7 is a schematic perspective view showing the positional relationship between the film feeding line L1 and the panel feeding line L2. In this embodiment, also shown in FIG. 7, the liquid crystal panel W is turned by the panel turning unit, which makes it possible to feed the optical functional films F11 and F21 in the film feeding line L1 arranged in such a manner that the optical functional films F11 and F21 being fed from the first and second continuous rolls R1 and R2 can be linearly aligned in planar view, and also makes it possible to feed the liquid crystal panel W in the panel feeding line L2 that is placed above the film feeding line L1 in an overlapping manner and formed linearly in planar view. In other words, the optical functional films F11 and F21 and the liquid crystal panel W are fed along the film feeding line L1 and the panel feeding line L2, which extend linearly in planar view, so that the manufacturing line can have an I-shape as shown in FIGS. 2A and 2B. Such an I-shaped manufacturing line can be installed in a more compact space than an L-shaped manufacturing line or the like.

Particularly, in this embodiment, the panel feeding line L2 is placed above the film feeding line L1, and the optical functional films F11 and F21 drawn from the first and second continuous rolls R1 and R2, respectively, are each bonded to the liquid crystal panel W from below. This feature makes it possible to prevent foreign bodies from falling on the liquid crystal panel W surface to be bonded, so that the bonding can be performed in a satisfactory manner.

The length of the panel turning unit can be made shorter and therefore the installation space can be further made smaller, when, as shown in FIGS. 6(a) and 6(b), the liquid crystal panel W is turned over about an axis (axis A1 or A2) not parallel to the long or short side of the liquid crystal panel W so that the positional relationship between the long and short sides of the liquid crystal panel W can be reversed or when, as shown in FIG. 6(d), turning over the liquid crystal panel W and rotating it horizontally are performed at the same time than when, as shown in FIG. 6(c), turning over the liquid crystal panel W and rotating it horizontally are performed independently. This advantageous effect will be more remarkable when the liquid crystal display is horizontally upsized. In particular, the configurations illustrated in FIGS. 6(a) and 6(b) can achieve the same effect through a single operation as in the case where turning over the liquid crystal panel W and rotating it horizontally are performed independently.

In this embodiment, the manufacturing line is entirely placed in a partition structure 50. Therefore, the film feeding line L1 and the panel feeding line L2 are placed in the partition structure 50, so that contamination with foreign bodies from the outside can be prevented and that the bonding can be performed in a more satisfactory manner. For example, the partition structure 50 may be formed by assembling transparent plates into a box-shaped structure.

In this embodiment, air circulation apparatuses 40 for circulating air in the partition structure 50 are provided at the top of the partition structure 50. In this embodiment, the air circulation apparatuses 40 blow air into the partition structure 50, and the blown air is allowed to flow from the upper side to the lower side in the partition structure 50 and discharged from openings 50a formed at the bottom of the partition structure 50. Thus, the air is circulated in the partition structure 50 to keep the inside of the partition structure 50 clean. When air is circulated in the partition structure 50 as described above, an I-shaped manufacturing line such as that according to this embodiment can produce better air flow than an L-shaped manufacturing line or the like. Thus, dust retention is prevented so that the cleanliness of the continuous rolls R1 and R2 and the liquid crystal panel W can be kept high during manufacture, and the temperature and humidity conditions can be controlled well during manufacture.

Figure 8A:
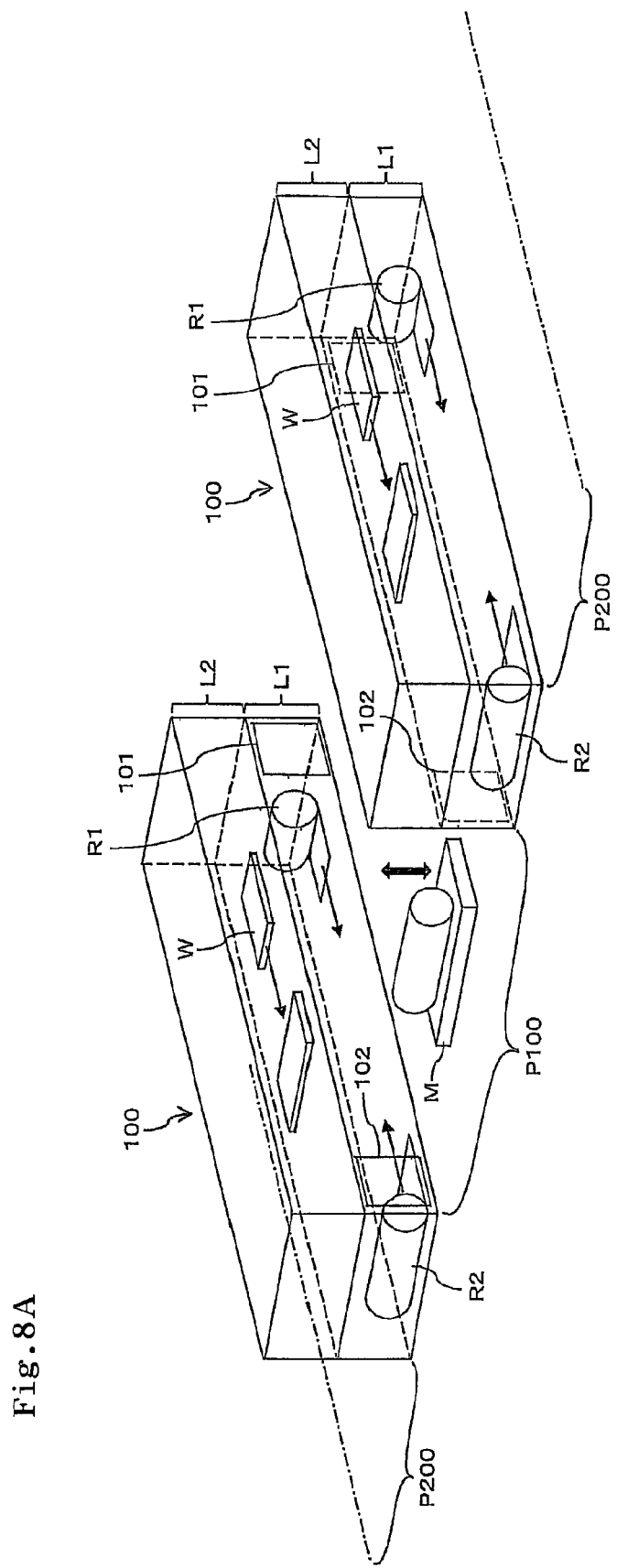
FIG. 8A is a schematic perspective view showing an example of the arrangement of a plurality of liquid crystal display device manufacturing apparatuses.

FIG. 8A is a schematic perspective view showing an example of the arrangement of a plurality of liquid crystal display device manufacturing apparatuses 100. This example illustrates a configuration in which a pair of manufacturing apparatuses 100 each having a linear line structure as shown in FIG. 2A or 2B are arranged parallel to each other. The liquid crystal display device manufacturing system may be configured to have two or more pairs of manufacturing apparatuses 100, as long as at least one pair of manufacturing apparatuses 100 are arranged parallel to one another in the liquid crystal display device manufacturing system.

In this embodiment, a pair of manufacturing apparatuses 100 each configured as shown in FIG. 2A or 2B are arranged to extend parallel to each other. The panel feeding lines L2 provided in the respective manufacturing apparatuses 100 are configured to feed the liquid crystal panel W in the same direction. Namely, the respective panel feeding lines L2 in the pair of manufacturing apparatuses 100 are arranged in the same direction.

Each manufacturing apparatus 100 includes an introduction part 101 for introducing the first continuous roll R1 into the apparatus and an introduction part 102 for introducing the second continuous roll R2 into the apparatus. These introduction parts 101 and 102 each have an insertion port for inserting the continuous roll R1 or R2 into the apparatus. The introduction parts 101 and 102 are each provided at one side of the film feeding line L1 in each manufacturing apparatus 100. Specifically, the insertion ports that form the introduction parts 101 and 102, respectively, are each provided at one transverse side in each manufacturing apparatus 100.

In this example, a feed path P100 for feeding the continuous rolls R1 and R2 is formed between the pair of manufacturing apparatuses 100 extending parallel to each other. The continuous roll (R1 and R2) introduction parts 101 and 102 of one of the manufacturing apparatuses 100 and the continuous roll (R1 and R2) introduction parts 101 and 102 of the other of the manufacturing apparatuses 100 are placed on the feed path P100 side, which is located inside the pair of panel feeding lines L1. Therefore, each manufacturing apparatus 100 is configured to have the continuous roll (R1 and R2) introduction parts 101 and 102 placed on one same side. The continuous roll (R1 and R2) introduction parts 101 and 102 of one of the manufacturing apparatuses 100 preferably have the same positional relationship along the panel feeding line L1 as the continuous roll (R1 and R2) introduction parts 101 and 102 of the other of the manufacturing apparatuses 100 so that the pair of manufacturing apparatuses 100 can be arranged to have an object-mirror image relationship.

The feed path P100 is provided with an automated apparatus M for automatically feeding the continuous rolls R1 and R2. The automated apparatus M is provided movable parallel to each manufacturing apparatus 100 along the feed path P100. The automated apparatus M preferably includes a hoisting and lowering mechanism for holding, hoisting and lowering the continuous rolls R1 and R2. In addition, the automated apparatus M is preferably configured to automatically attach and detach the continuous rolls R1 and R2 to and from the manufacturing apparatuses 100 through the introduction parts 101 and 102. It will be understood that such a configuration is non-limiting, and in an alternative configuration, the automated apparatus M may automatically perform only the feeding of the continuous rolls R1 and R2, and the continuous rolls R1 and R2 may be attached and detached by workers.

Working paths P200 are formed outside the pair of panel feeding lines L1, namely, on the opposite sides from the feed path P100, respectively. The working paths P200 are areas provided for workers to do jobs, in which jobs other than the feeding, attachment and detachment of the continuous rolls R1 and R2 may be performed.

In this embodiment, the continuous roll (R1 and R2) introduction parts 101 and 102 of one and the other of the manufacturing apparatuses 100 are placed on one same side located inside the pair of film feeding lines L1, so that there is no need to form the continuous roll (R1 and R2) feed path P100 and the working path P200 in the same aisle, which makes it possible to increase the productivity per space for installation of the manufacturing apparatus 100. At the same time, the separation of the feed path P100 and the working path P200 can ensure a higher level of safety.

In this embodiment, the continuous rolls R1 and R2 can be introduced into the pair of manufacturing apparatuses 100 through the feed path P100 provided between the pair of manufacturing apparatuses 100, so that the productivity per space for installation of the manufacturing apparatus 100 can be further increased. Particularly when the continuous rolls R1 and R2 are fed using the automated apparatus M, the pair of manufacturing apparatuses 100 can be operated using the same automated apparatus M, which makes it possible to reduce the equipment cost.

It should be noted that both of the first continuous roll R1 introduction parts 101 and the second continuous roll R2 introduction parts 102 do not always have to be placed on one same side located inside the pair of film feeding lines L1, and at least one type of the introduction parts may be placed on one same side located inside the pair of film feeding lines L1. In addition, bonding the optical functional films F11 and F21 to both sides of the liquid crystal panel W is also a non-limiting feature, and an optical functional film may be bonded to only one side. In such a case, each manufacturing apparatus 100 may be configured to receive only one continuous roll.

In the pair of manufacturing apparatuses 100 according to this embodiment, the first continuous roll R1 introduction parts 101 are provided so that the first continuous rolls R1 can be placed at the same level, and the second continuous roll R2 introduction parts 102 are provided so that the second continuous rolls R2 can be placed at the same level. In this case, for example, the introduction parts 101 of the pair of manufacturing apparatuses 100 preferably have the first continuous roll R1 insertion ports at the same level, and the introduction parts 102 of the pair of manufacturing apparatuses 100 preferably have the second continuous roll R2 insertion ports at the same level.

This feature makes it possible to attach and detach the first continuous rolls R1 at the same level to and from the first continuous roll R1 introduction parts 101 in the pair of manufacturing apparatuses 100 and to attach and detach the second continuous rolls R2 at the same level to and from the second continuous roll R2 introduction parts 102 in the pair of manufacturing apparatuses 100. Therefore, it facilitates attaching and detaching the first and second continuous rolls R1 and R2. When the first and second continuous rolls R1 and R2 are attached and detached using an automated apparatus M according to this embodiment, there is no need to adjust the level of the automated apparatus M in each of the processes of attaching and detaching the first and second continuous rolls R1 and R2 in the pair of manufacturing apparatuses 100, which improves workability.

Moreover, in the pair of manufacturing apparatuses 100 according to this embodiment, the first continuous roll R1 introduction parts 101 and the second continuous roll R2 introduction parts 102 are provided so that the first and second continuous rolls R1 and R2 can be placed at a level lower than the level of the panel feeding lines L2. This feature can be achieved by placing the panel feeding lines L2 above the film feeding lines L1. According this feature, the first and second continuous rolls R1 and R2, which are heavy materials, do not need to be lifted to a higher level, which improves safety.

Figure 8B:
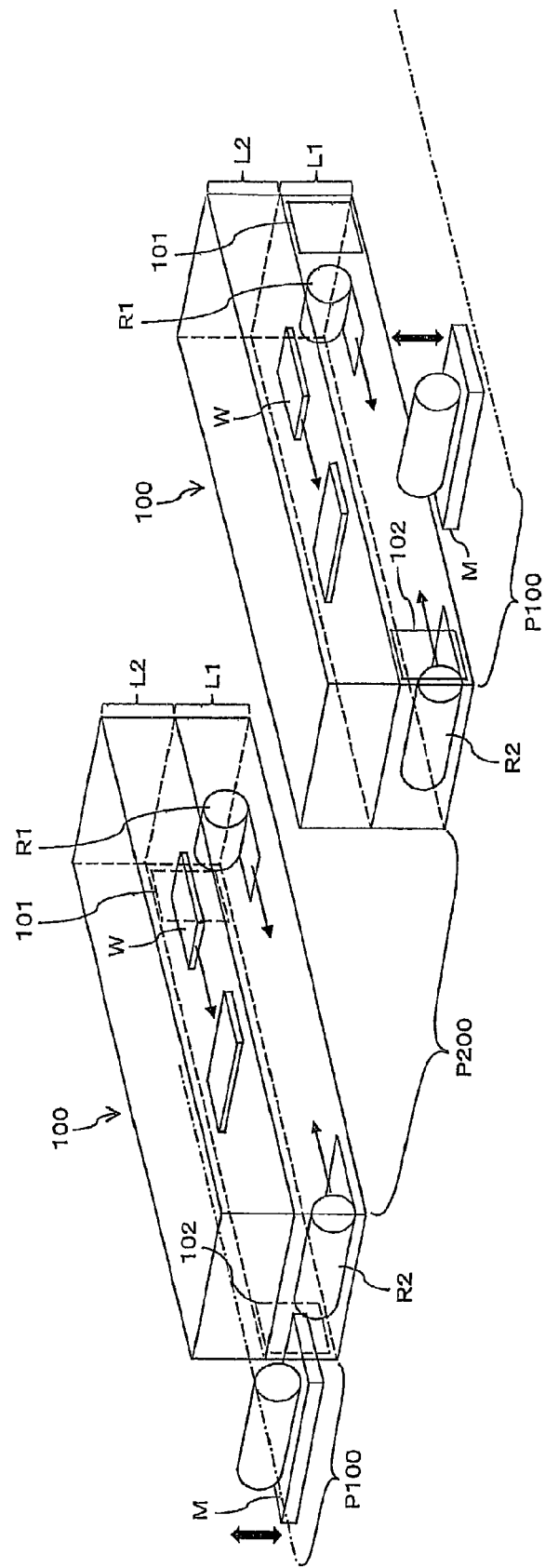
FIG. 8B is a schematic perspective view showing another example of the arrangement of a plurality of liquid crystal display device manufacturing apparatuses.

FIG. 8B is a schematic perspective view showing another example of the arrangement of a plurality of liquid crystal display device manufacturing apparatuses 100. This example illustrates a configuration in which a pair of manufacturing apparatuses 100 each having a linear line structure as shown in FIG. 2A or 2B are arranged parallel to each other. The liquid crystal display device manufacturing system may be configured to have two or more pairs of manufacturing apparatuses 100, as long as at least one pair of manufacturing apparatuses 100 are arranged parallel to one another in the liquid crystal display device manufacturing system.

This embodiment differs from the embodiment shown in FIG. 8A in that the continuous roll (R1 and R2) introduction parts 101 and 102 of one and the other of the manufacturing apparatuses 100 are placed outside a pair of panel feeding lines L1. Therefore, feed paths P100 for feeding the continuous rolls R1 and R2 are formed outside the pair of panel feeding lines L1, and a working path P200 provided for workers to do jobs is formed inside the pair of panel feeding lines L1, namely, between the pair of manufacturing apparatuses 100. Each feed path P100 is preferably provided with an automated apparatus M for automatically feeding the continuous rolls R1 and R2.

In this embodiment, the continuous roll (R1 and R2) introduction parts 101 and 102 of one and the other of the manufacturing apparatuses 100 are placed on one same side located outside the pair of film feeding lines L1, so that there is no need to form the continuous roll (R1 and R2) feed path P100 and the working path P200 in the same aisle, which makes it possible to increase the productivity per space for installation of the manufacturing apparatus 100. At the same time, the separation of the feed path P100 and the working path P200 can ensure a higher level of safety.

FIGS. 9A and 9B are schematic side views showing other examples of the arrangement of continuous rolls R1 and R2 and take-up rolls 172 and 272. In both examples shown in FIGS. 9A and 9B, a first take-up roll 172 and a first continuous roll R1 are arranged in this order along a direction parallel to the feeding direction of the liquid crystal panel W on the panel feeding line L2, and a second take-up roll 272 and a second continuous roll R2 are also arranged in this order along a direction parallel to the feeding direction of the liquid crystal panel W on the panel feeding line L2.

More specifically, in the example shown in FIG. 9A, the optical film laminates F1 and F2 are fed from the continuous rolls R1 and R2, respectively, in a direction opposite to the feeding direction of the liquid crystal panel W, and the carrier films F12 and F22 peeled off by the peeling units 171 and 271 are fed in a direction opposite to the feeding direction of the liquid crystal panel W and wound onto the take-up rolls 172 and 272, respectively. On the other hand, in the example shown in FIG. 9B, the optical film laminates F1 and F2 are fed from the continuous rolls R1 and R2, respectively, in the same direction as the feeding direction of the liquid crystal panel W, and the carrier films F12 and F22 peeled off by the peeling units 171 and 271 are fed in a direction opposite to the feeding direction of the liquid crystal panel W, allowed to pass through above the continuous rolls R1 and R2, and wound onto the take-up rolls 172 and 272, respectively.

In the structures illustrated in the FIGS. 9A and 9B, the first optical film laminate F1 can be fed from the first continuous roll R1 at the same level as the first carrier film F12 is wound onto the first take-up roll 172, and the second optical film laminate F2 can be fed from the second continuous roll R2 at the same level as the second carrier film F22 is wound onto the second take-up roll 272. This allows easy attachment or detachment of the continuous rolls R1 and R2 and the take-up rolls 172 and 272. For example, when the continuous rolls R1 and R2 and the take-up rolls 172 and 272 are attached or detached using an attachment/detachment mechanism, there is no need to control the level of the attachment/detachment mechanism, which improves the workability.

FIGS. 9A and 9B show examples using a panel turning unit 200. Alternatively, a panel rotating mechanism 20 and a panel-turning-over mechanism 21 may be provided independently.

DESCRIPTION OF REFERENCE CHARACTERS

In the drawings, reference character 12 represents a first feeder, 14 a first defect inspection apparatus, 16 a first cutting apparatus, 18 a first bonding apparatus, 20 a panel rotating mechanism, 21 a panel-turning-over mechanism, 22 a second feeder, 24 a second defect inspection apparatus, 26 a second cutting apparatus, 28 a second bonding apparatus, 50 a partition structure, 100 a manufacturing apparatus, 101 an introduction part, 102 an introduction part, 200 a panel turning unit, F1 a first optical film laminate, F11 a first optical functional film, F12 a first carrier film, F2 a second optical film laminate, F21 a second optical functional film, F22 a second carrier film, L1 a film feeding line, L2 a panel feeding line, M an automated apparatus, P1 a first linear feed path, P2 a second linear feed path, P100 a feed path, P200 a working path, R1 a first continuous roll, R2 a second continuous roll, and W a liquid crystal panel.

The invention claimed is:
1. A system for manufacturing a liquid crystal display device, comprising:
at least one pair of liquid crystal display device manufacturing apparatuses that are arranged parallel to one another and each has a linear line structure and each comprises: a film feeding line arranged to feed an optical functional film linearly in planar view from a continuous roll; a panel feeding line that is placed above or below the film feeding line in an overlapping manner and arranged to feed a liquid crystal panel linearly in planar view; and a part for introducing the continuous roll, wherein the part is provided at one side of the film feeding line, wherein the panel feeding lines in the pair of manufacturing apparatuses are arranged in the same direction, and the part for introducing the continuous roll in one of the manufacturing apparatuses and the part for introducing the continuous roll in another of the manufacturing apparatuses are placed on one same side located inside or outside a pair of the film feeding lines.

2. The system according to claim 1, wherein the parts for introducing the continuous rolls in the pair of manufacturing apparatuses are placed inside a pair of the film feeding lines.

3. The system according to claim 1 or 2, wherein the pair of manufacturing apparatuses are each a linear line structure apparatus for manufacturing a liquid crystal display device by a process comprising feeding optical functional films from first and second continuous rolls with different widths, respectively, which are each formed by winding, into a roll, a long optical functional film comprising a polarizing film, transversely cutting the optical functional films to form sheet pieces of the optical functional films, and bonding the sheet pieces to both surfaces of a rectangular liquid crystal panel, the film feeding line is arranged to feed the optical functional films from the first and second continuous rolls in such a manner that the optical functional films being fed are linearly aligned with each other in planar view, the film feeding line has, at one side, a part for introducing the first continuous roll and a part for introducing the second continuous roll, the first continuous roll introducing part of one of the manufacturing apparatuses and the first continuous roll introducing part of another of the manufacturing apparatuses are placed on one same side located inside or outside a pair of the film feeding lines, and the second continuous roll introducing part of one of the manufacturing apparatuses and the second continuous roll introducing part of another of the manufacturing apparatuses are placed on one same side located inside or outside a pair of the film feeding lines.

4. The system according to claim 3, wherein the panel feeding line is placed above the film feeding line in an overlapping manner, and the panel feeding line is provided with a panel turning unit for turning over and horizontally rotating the liquid crystal panel so that bonding one sheet piece of the optical functional film to the lower side of the liquid crystal panel placed on the panel feeding line can be followed by bonding another sheet piece of the optical functional film to the lower side of the liquid crystal panel.

5. The system according to claim 3, wherein the panel feeding line is placed above the film feeding line in an overlapping manner, and the panel feeding line is provided with a panel turning unit for turning over the liquid crystal panel about a single axis neither parallel to a long side of the liquid crystal panel nor to a short side of the liquid crystal panel so that the positional relationship between the long and short sides of the liquid crystal panel can be reversed and so that bonding one sheet piece of the optical functional film to the lower side of the liquid crystal panel placed on the panel feeding line can be followed by bonding another sheet piece of the optical functional film to the lower side of the liquid crystal panel.

6. The system according to claim 4, wherein the liquid crystal display device manufacturing apparatuses are each an apparatus for manufacturing a liquid crystal display device by a process comprising feeding optical functional films and carrier films from first and second continuous rolls with different widths, respectively, which are each formed by winding, into a roll, a laminate comprising a carrier film and a long optical functional film comprising a polarizing film, transversely cutting the optical functional films with the carrier film left uncut to form sheet pieces of the optical functional films, peeling off the sheet pieces of the optical functional films from the carrier films, and bonding the sheet pieces to both surfaces of a rectangular liquid crystal panel, the film feeding line is provided with first and second take-up rolls for taking up the carrier films fed from the first and second continuous rolls, respectively, and separated from the sheet pieces of the optical functional films, the first take-up roll and the first continuous roll are arranged in this order along a direction parallel to the direction of feeding of the liquid crystal panel in the panel feeding line, and the second take-up roll and the second continuous roll are arranged in this order along a direction parallel to the direction of feeding of the liquid crystal panel in the panel feeding line.

7. The system according to claim 1 or 2, wherein the pair of manufacturing apparatuses are each a linear line structure apparatus for manufacturing a liquid crystal display device by a process comprising feeding sheet pieces of optical functional films and carrier films from first and second continuous rolls with different widths, respectively, which are each formed by winding, into a roll, a laminate comprising a carrier film and sheet pieces of an optical functional film comprising a polarizing film, peeling off the sheet pieces of the optical functional films from the carrier films, and bonding the sheet pieces to both surfaces of a rectangular liquid crystal panel, the film feeding line is arranged to feed the optical functional films from the first and second continuous rolls in such a manner that the optical functional films being fed are linearly aligned with each other in planar view, the film feeding line has, at one side, a part for introducing the first continuous roll and a part for introducing the second continuous roll, the first continuous roll introducing part of one of the manufacturing apparatuses and the first continuous roll introducing part of another of the manufacturing apparatuses are placed on one same side located inside or outside a pair of the film feeding lines, and the second continuous roll introducing part of one of the manufacturing apparatuses and the second continuous roll introducing part of another of the manufacturing apparatuses are placed on one same side located inside or outside a pair of the film feeding lines.

8. The system according to claim 7, wherein the panel feeding line is placed above the film feeding line in an overlapping manner, and the panel feeding line is provided with a panel turning unit for turning over and horizontally rotating the liquid crystal panel so that bonding one sheet piece of the optical functional film to the lower side of liquid crystal panel placed on the panel feeding line can be followed by bonding another sheet piece of the optical functional film to the lower side of the liquid crystal panel.

9. The system according to claim 7, wherein the panel feeding line is placed above the film feeding line in an overlapping manner, and the panel feeding line is provided with a panel turning unit for turning over the liquid crystal panel about a single axis neither parallel to a long side of the liquid crystal panel nor to a short side of the liquid crystal panel so that the positional relationship between the long and short sides of the liquid crystal panel can be reversed and so that bonding one sheet piece of the optical functional film to the lower side of the liquid crystal panel placed on the panel feeding line can be followed by bonding another sheet piece of the optical functional film to the lower side of the liquid crystal panel.

10. The system according to claim 8, wherein the film feeding line is provided with first and second take-up rolls for taking up the carrier films fed from the first and second continuous rolls, respectively, and separated from the sheet pieces of the optical functional films, the first take-up roll and the first continuous roll are arranged in this order along a direction parallel to the direction of feeding of the liquid crystal panel in the panel feeding line, and the second take-up roll and the second continuous roll are arranged in this order along a direction parallel to the direction of feeding of the liquid crystal panel in the panel feeding line.

11. The system according to claim 3, wherein the first continuous roll introducing parts in the pair of manufacturing apparatuses are provided so that the first continuous rolls can be placed at the same level, and the second continuous roll introducing parts in the pair of manufacturing apparatuses are provided so that the second continuous rolls can be placed at the same level.

12. The system according to claims 3, wherein the first continuous roll introducing parts and the second continuous roll introducing parts in the pair of manufacturing apparatuses are provided so that the first and second continuous rolls can be placed at a level lower than the level of the panel feeding lines.

* * * * *